(12) United States Patent
Cordatos et al.

(10) Patent No.: US 11,801,479 B2
(45) Date of Patent: Oct. 31, 2023

(54) METHOD OF IMPROVING THE EFFECTIVENESS OF AN OXYGEN REMOVAL UNIT FOR A FUEL SUPPLY SYSTEM AND THE RESULTING OXYGEN REMOVAL UNIT

(71) Applicant: Hamilton Sundstrand Corporation, Charlotte, NC (US)

(72) Inventors: Haralambos Cordatos, Colchester, CT (US); Murtuza Lokhandwalla, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 199 days.

(21) Appl. No.: 17/169,742

(22) Filed: Feb. 8, 2021

(65) Prior Publication Data
US 2022/0251382 A1 Aug. 11, 2022

(51) Int. Cl.
| | |
|---|---|
| *B01D 65/10* | (2006.01) |
| *B01D 19/00* | (2006.01) |
| *F02C 7/22* | (2006.01) |
| *F23R 3/40* | (2006.01) |
| *B01J 23/42* | (2006.01) |
| *C08K 5/5419* | (2006.01) |
| *C08L 83/04* | (2006.01) |
| *B01D 63/02* | (2006.01) |

(52) U.S. Cl.
CPC ....... *B01D 65/108* (2013.01); *B01D 19/0031* (2013.01); *F02C 7/22* (2013.01); *F23R 3/40* (2013.01); *B01D 63/02* (2013.01); *B01D 2257/104* (2013.01); *B01J 23/42* (2013.01); *C08K 5/5419* (2013.01); *C08L 83/04* (2013.01); *C08L 2312/00* (2013.01); *F05D 2260/607* (2013.01); *F23K 2900/05082* (2013.01)

(58) Field of Classification Search
CPC ...... C09D 183/04; B01D 63/02; B01D 63/06; B01D 2257/104; F23K 2900/05082
See application file for complete search history.

(56) References Cited

U.S. PATENT DOCUMENTS

| | | | | |
|---|---|---|---|---|
| 4,230,463 A | * | 10/1980 | Henis | B01D 53/22 95/55 |
| 6,015,516 A | * | 1/2000 | Chung | D01D 5/24 264/129 |
| 6,315,815 B1 | | 11/2001 | Spadaccini et al. | |
| 6,730,145 B1 | | 5/2004 | Li | |
| 8,070,859 B2 | | 12/2011 | Ma et al. | |
| 10,556,193 B2 | | 2/2020 | Dyer | |
| 10,792,591 B2 | | 10/2020 | Dyer | |
| 2003/0024881 A1 | * | 2/2003 | Kalthod | B01D 67/0083 210/488 |
| 2016/0214067 A1 | * | 7/2016 | Miller | B01D 53/228 |
| 2019/0054423 A1 | | 2/2019 | Cordatos | |

FOREIGN PATENT DOCUMENTS

| | | | |
|---|---|---|---|
| CN | 108525524 | * | 9/2018 |
| CN | 108525524 A | | 9/2018 |

OTHER PUBLICATIONS

Sylgard 184 Silicon Elastomer Technical Data Sheet (no date).*
Machine translation of CN 108525524 A into English (no date).*
Abstract for CN 108525524 (A), Published: Sep. 14, 2018, 1 page.
European Search Report for Application No. 22155718.4, dated Jun. 28, 2022, 17 pages.
DEHESIVE® 940A Release Coating, Wacker Silicones, SJR, Version 2.00, Dec. 6, 2003, 3 pages.
DEHESIVE® 944, Wacker, Safety Data Sheet, Version 1.0 (US), Nov. 8, 2016; 11 pages.
WACKER® Catalyst OL, Wacker, Safety Data Sheet, Version 3.1 (US); Nov. 8, 2016, 8 pages.
WACKER® Crosslinker V 24, Wacker, Safety Data Sheet, Version: 3.1 (US); Nov. 8, 2016; 9 pages.

* cited by examiner

*Primary Examiner* — Marc S Zimmer

(74) *Attorney, Agent, or Firm* — CANTOR COLBURN LLP

(57) ABSTRACT

Disclosed is a method of improving the effectiveness of an oxygen removal unit for a fuel supply system. The method includes contacting a tube bundle with a repair liquid at 20 to 40° C. for less than two hours. The tube bundle includes tubes having an air permeable, non-porous polymer layer with discontinuities. The repair liquid includes a solvent and a curable thermoset material. The curable thermoset material is deposited in the discontinuities of the air permeable, non-porous polymer layer and cured. Also disclosed is a fuel system oxygen removal unit including a tubular bundle formed of tubes having an air permeable, non-porous polymer layer disposed on a microporous support wherein the air permeable, non-porous polymer layer includes discrete segments of a cured thermoset material.

8 Claims, 2 Drawing Sheets

METHOD OF IMPROVING THE EFFECTIVENESS OF AN OXYGEN REMOVAL UNIT FOR A FUEL SUPPLY SYSTEM AND THE RESULTING OXYGEN REMOVAL UNIT

BACKGROUND

This application relates to an oxygen removal unit for fuel supply systems such as those used with aircraft engines and particularly to the membrane of the oxygen removal unit.

Aircraft engines typically include a fuel supply system which supplies fuel to a combustor in a gas turbine engine. The fuel often entrains oxygen. The dissolved oxygen within the hydrocarbon fuel may react at elevated temperature to form free radicals such as coke precursors that may lead to the formation of deposits. These deposits may clog fuel filters, injectors, or other fuel system components.

Robust oxygen removal systems are desired for efficient and reliable engine operation.

BRIEF DESCRIPTION

Disclosed is a method of improving the effectiveness of an oxygen removal unit for a fuel supply system. The method includes contacting a tube bundle with a repair liquid at 20 to 40° C. for less than two hours. The tube bundle includes tubes having an air permeable, non-porous layer with discontinuities. The repair liquid includes a solvent and a curable thermoset material. The repair liquid is deposited in the discontinuities of the air permeable, non-porous layer. The solvent is evaporated and the curable mixture located in the discontinuities is cured.

In addition to one or more of the features described above, or as an alternative to any of the foregoing embodiments, the solvent comprises a hydrocarbon having 5 to 7 carbons or a mixture of hydrocarbons having 5 to 7 carbons.

In addition to one or more of the features described above, or as an alternative to any of the foregoing embodiments, the curable thermoset material is a curable silicone mixture. The curable silicone mixture may include a vinyl polydimethylsiloxane, a siloxane crosslinker and a platinum catalyst compound.

In addition to one or more of the features described above, or as an alternative to any of the foregoing embodiments, the repair liquid comprises 1 to 20 wt % of the vinyl polydimethylsiloxane based on the total weight of the repair liquid.

In addition to one or more of the features described above, or as an alternative to any of the foregoing embodiments, the air permeable, non-porous layer is a fluoropolymer layer. The fluoropolymer layer may have a thickness of 0.1 to 2 micrometers.

In addition to one or more of the features described above, or as an alternative to any of the foregoing embodiments, the tube bundle is contacted with the repair liquid for less than one hour.

In addition to one or more of the features described above, or as an alternative to any of the foregoing embodiments, curing the curable thermoset material includes holding the curable thermoset material at 40 to 90° C.

Also disclosed is a fuel system oxygen removal unit including a tubular bundle formed of tubes having an air permeable, non-porous polymer layer disposed on a microporous support wherein the air permeable, non-porous polymer layer includes discrete segments of a cured thermoset material.

In addition to one or more of the features described above, or as an alternative to any of the foregoing embodiments, the air permeable, non-porous polymer layer is a fluoropolymer layer.

In addition to one or more of the features described above, or as an alternative to any of the foregoing embodiments, the fluoropolymer layer has a thickness of 0.1 to 5 micrometers.

In addition to one or more of the features described above, or as an alternative to any of the foregoing embodiments, the cured thermoset material includes a cured silicone.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
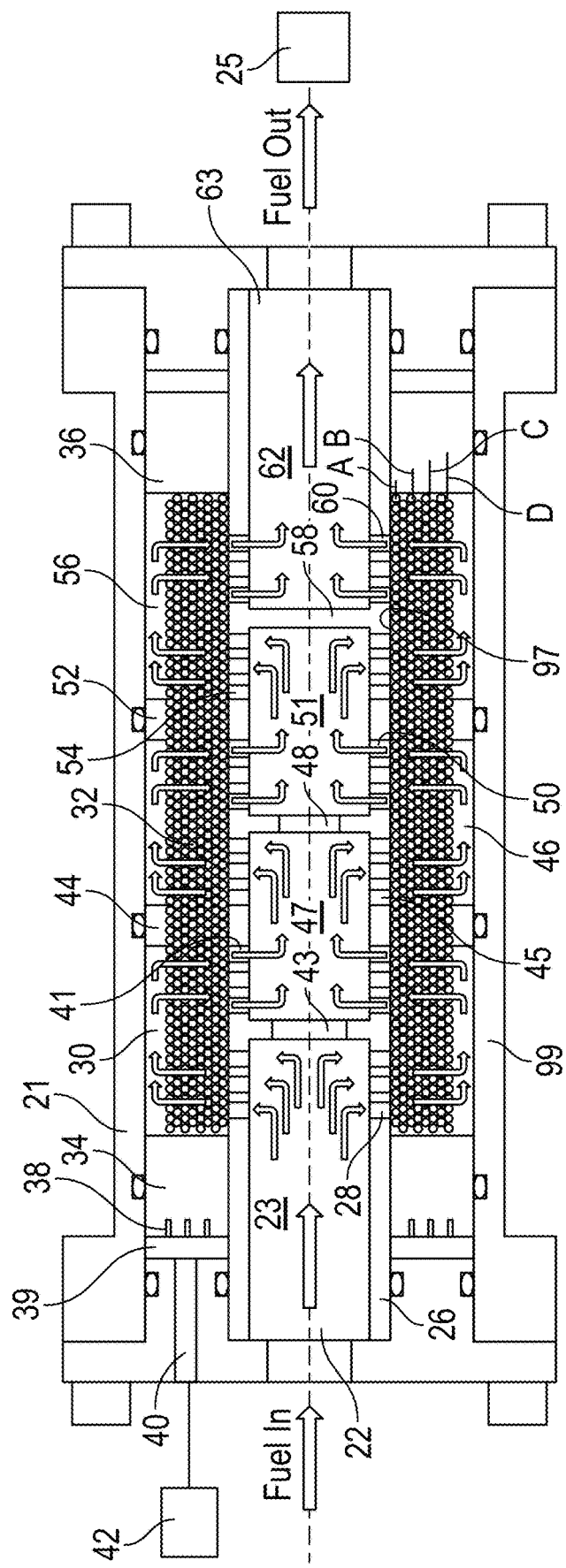
FIG. 1 schematically shows a cross-section through an oxygen removal unit.

FIG. 1 shows an oxygen removal unit 21 for a fuel supply system. Fuel from a fuel tank enters an inlet 22 defined by a hollow mandrel 26. The fuel passes along a flow path, as will be described, and leaves the unit 21 via outlet 63, possibly to be delivered to a combustor 25 such as in a gas turbine engine.

As shown, the fuel enters a first chamber 23 within the mandrel 26 and then passes outwardly through openings 28 in the hollow mandrel 26 into a second chamber 30. The tube bundle 32 has a hollow center 97 receiving the hollow mandrel 26. The bundle of tubes 32 are placed radially outwardly of the hollow mandrel 26. Thus, the fuel passes over the tube bundle 32.

There are a plurality of layers of tubes, labeled A, B, C, and D, extending in a radially outer direction. While the mandrel 26 may be cylindrical, other shapes may be utilized. However, the tube bundle 32 is placed outwardly of the mandrel 26 as illustrated. Closing portions 34 and 36, possibly made of epoxy, are formed at ends of the bundle 32. It should be understood the tubes are also located within the closing portions 34 and 36. Also, ends 38 of the tubes in bundle 32 are shown schematically in the epoxy area 34. Those ends 38 communicate with vacuum chamber 39 leading to a passage 40 into vacuum source 42.

As fuel passes over the tube bundle 32 oxygen passes inwardly into the tubes and is removed by the vacuum source 42.

The mandrel 26 has an inner baffle 43 separating chamber 23 from chamber 47. Openings 50 in mandrel 26 allow the fuel to pass back across bundle 32 and into chamber 47. That fuel then passes back outwardly through opening 45 across bundle 32 and into a chamber 46. As shown, a baffle 44 separates chamber 30 and 46. The fuel in chamber 46 now passes back inward of openings 50 into a chamber 51.

Chamber 51 is maintained separate from chamber 46 by a baffle 48. From chambers 51, the fuel passes back outwardly through openings 54, across the bundle 32, and into a chamber 56. Chamber 56 is maintained separate from chamber 46 by a baffle 52. An outer housing 99 surrounds the tube bundle 32 but is spaced to define the outer chambers.

Fuel in the chamber 56 passes inwardly through openings 60 into chamber 62 and may then be delivered to the combustor 25 through an outlet 63.

While inlet 22 and outlet 63 are both connected to inner chambers, either, or both could be connected to outer chambers.

By arranging the several baffles, as illustrated, for example, in FIG. 1, it is ensured that the fuel repeatedly passes over the bundle to provide very efficient oxygen removal in a relatively small envelope.

The tube bundle includes selectively permeable membrane tubes. The tubes have a thin air permeable, non-porous polymer layer that is made by solution casting a polymer onto a microporous support structure. The air permeable, non-porous layer has pinhole defects (discontinuities) which can leak hot jet fuel (75 to 95° C.) and contaminate the system. This problem is not seen in other types of oxygen removal systems that employ a similar technology applied to room temperature fluids or less volatile fluids.

Figure 2:
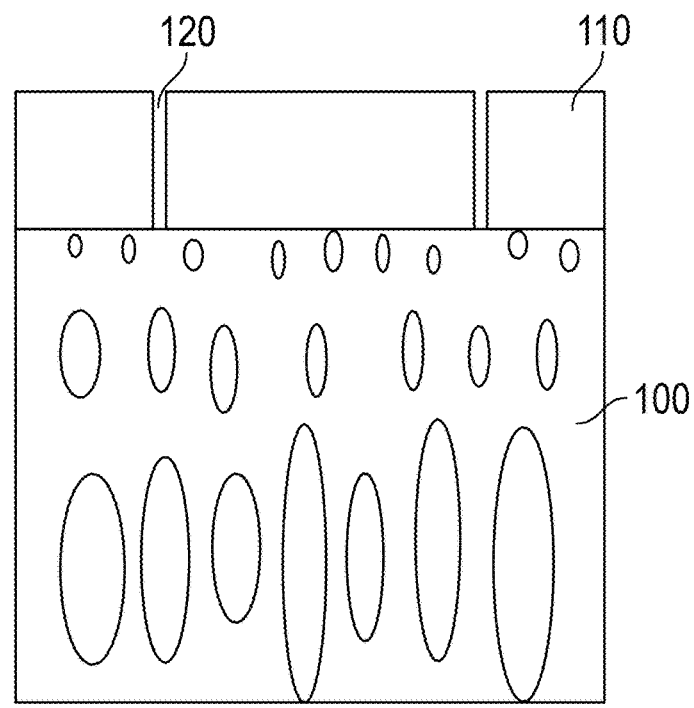
FIG. 2 shows detail of a tube from a tube bundle prior to repair.

FIG. 2 illustrates the problem. In FIG. 2 the microporous support structure 100 is covered by air permeable, non-porous layer 110. Air permeable, non-porous layer 110 may have a thickness of 0.1 to 5 micrometers, or 1 to 2 micrometers. Air permeable, non-porous layer 110 has discontinuities 120 which result in the leakage of hot jet fuel. Air permeable, non-porous layer 110 may be a fluoropolymer layer.

Repair is performed by contacting the tube bundle with a repair liquid. The repair liquid includes a solvent and a curable thermoset material. The solvent may be a hydrocarbon having 5 to 7 carbons as well as a mixture of two or more hydrocarbons having 5 to 7 carbons. The curable thermoset material, when cured, is chemically resistant to jet fuel. The curable thermoset material may be a curable silicone mixture. The curable silicone mixture may include a vinyl polydimethylsiloxane, a siloxane crosslinker such as methylhydrogenpolysiloxane and a platinum catalyst compound. Exemplary repair liquid systems are commercially available. An exemplary curable silicone is Dehesive® 940 available from Wacker Silicones.

The repair liquid may include the curable thermoset material in an amount of 1 to 20 weight percent (wt %) based on the total weight of the repair liquid. Within this range the amount may be greater than or equal to 2 wt %, or, greater than or equal to 3 wt %. Also within this range the amount may be less than or equal to 15 wt %, or, less than or equal to 10 wt %.

The repair liquid is introduced to the oxygen removal unit through inlet 22 and contacted with the tube bundle for less than or equal to 2 hours, or less than or equal to 1 hour. The repair liquid is contacted with the tube bundle for at least 5 minutes. The repair liquid may be contacted with the tube bundle under pressure. Alternatively, a vacuum of 500 to 1 Torr may be used to draw the repair liquid from the central portion of the tubes into the discontinuities in the air permeable, non-porous layer.

The tube bundle may be drained of excess repair liquid. The tube bundle having repair liquid in the discontinuities is held at a temperature of 40 to 90° C. to evaporate solvent and cure the curable thermoset material. Within this range, the temperature may be 50 to 85° C. or 80 to 85° C. The time to cure the curable thermoset material may be dependent on temperature as a cure will generally take less time at a higher temperature. Exemplary times may range from less than a minute to 30 minutes.

The curable thermoset material, such as silicone, is deposited in the discontinuities and cured to close the discontinuities without detectably affecting the oxygen permeability of the air permeable, non-porous layer 110 or obstructing the microporous structure 100.

Figure 3:
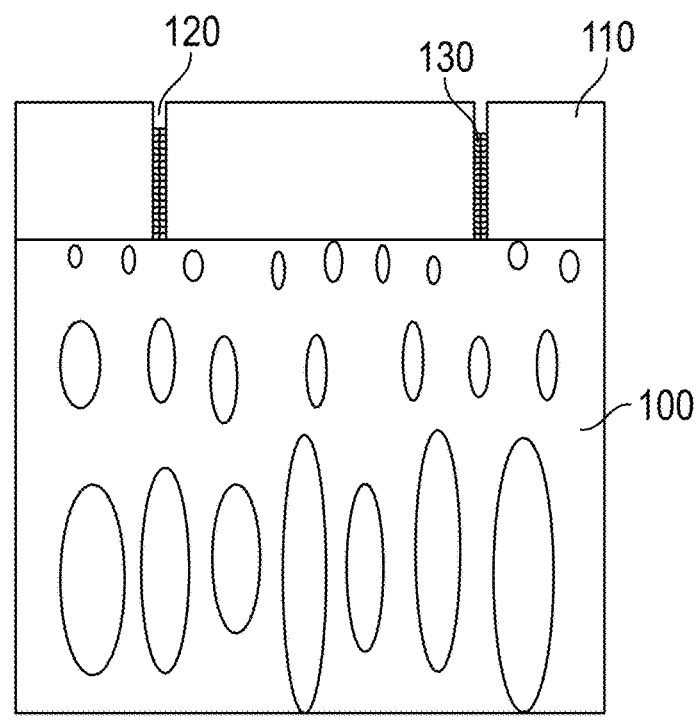
FIG. 3 shows detail of a tube from a tube bundle after repair.

FIG. 3 shows air permeable, non-porous layer 110 with discontinuities 120 filled with cured thermoset material 130.

The above-described method produces an oxygen removal unit for a fuel system that includes a tube bundle formed of tubes having an air permeable, non-porous polymer layer disposed on a microporous support. The air permeable, non-porous polymer layer has discrete portions of a cured thermoset material such as a cured silicone. The air permeable, non-porous polymer layer may include a fluoropolymer.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of improving the effectiveness of an oxygen removal unit for a fuel supply system and having an inlet, the method comprising:

placing a tube bundle in the oxygen removal unit, the tube bundle including a microporous support structure covered by an air permeable, non-porous layer;

introducing a repair liquid into the oxygen removal unit though the inlet;

drawing the repair liquid through the oxygen removal unit and the tube bundle such that it passes through the microporous support structure and the air permeable, non-porous layer, wherein the repair liquid is drawn through the bundle under pressure and at 20 to 40° C. for less than two hours, wherein the repair liquid comprises a solvent and a curable thermoset material;

wherein drawing results in deposition of the repair liquid in the pinhole defects of the air permeable, non-porous layer;
draining the tube bundle of excess repair liquid;
evaporating the solvent; and
curing the curable thermoset material located in the pinhole defects of the air permeable, non-porous layer;
wherein the solvent comprises a hydrocarbon having 5 to 7 carbons or a mixture of hydrocarbons having 5 to 7 carbons.

2. The method of claim 1, wherein the curable thermoset material is a curable silicone mixture.

3. The method of claim 2, wherein the curable silicone mixture comprises a vinyl polydimethylsiloxane, a siloxane crosslinker and a platinum catalyst compound.

4. The method of claim 3, wherein the repair liquid comprises 1 to 20 wt % of the vinyl polydimethylsiloxane based on the total weight of the repair liquid.

5. The method of claim 1, wherein the air permeable, non-porous layer is a fluoropolymer layer.

6. The method of claim 5, wherein the fluoropolymer layer has a thickness of 0.1 to 2 micrometers.

7. The method of claim 1, wherein the tube bundle is contacted with the repair liquid for less than one hour.

8. The method of claim 1, wherein curing comprises holding the curable thermoset material at 40 to 90° C.

* * * * *